(12) United States Patent
Tanaka et al.

(10) Patent No.: US 8,689,761 B2
(45) Date of Patent: Apr. 8, 2014

(54) EXHAUST POPPET VALVE AND SOLUTION HEAT TREATMENT METHOD OF THE SAME

(75) Inventors: Yasuhito Tanaka, Kanagawa (JP); Hisanaga Yokoyama, Kanagawa (JP)

(73) Assignee: Nittan Valve Co., Ltd., Hadano-Shi, Kanagawa (JP)

( * ) Notice: Subject to any disclaimer, the term of this patent is extended or adjusted under 35 U.S.C. 154(b) by 229 days.

(21) Appl. No.: 13/055,222

(22) PCT Filed: Jul. 25, 2008

(86) PCT No.: PCT/JP2008/063451
§ 371 (c)(1),
(2), (4) Date: Jan. 21, 2011

(87) PCT Pub. No.: WO2010/010636
PCT Pub. Date: Jan. 28, 2010

(65) Prior Publication Data
US 2011/0126791 A1 Jun. 2, 2011

(51) Int. Cl.
*F01L 3/02* (2006.01)
*F01L 3/00* (2006.01)
*H01F 1/04* (2006.01)
*H01F 1/00* (2006.01)
*F01L 3/20* (2006.01)
*F01L 3/08* (2006.01)
*C22C 38/02* (2006.01)

(52) U.S. Cl.
CPC ... *F01L 3/00* (2013.01); *F01L 3/02* (2013.01); *F01L 3/20* (2013.01); *F01L 3/08* (2013.01); *C22C 38/02* (2013.01)
USPC .................. 123/188.3; 123/188.2; 123/188.1; 148/112; 148/121

(58) Field of Classification Search
CPC .............. F01L 3/02; F01L 3/20; F01L 3/10; F01L 3/08; C21D 8/1272; C22C 38/02; H01F 1/15341; H01F 1/15308
USPC .................................................. 123/188.3
See application file for complete search history.

(56) References Cited

U.S. PATENT DOCUMENTS 2,888,373 A    5/1959   Cherrie et al.
4,728,374 A * 3/1988   Larson et al. ............ 148/320

(Continued)

FOREIGN PATENT DOCUMENTS

CN          1357426      7/2002
JP          57-145927    9/1982

(Continued)

OTHER PUBLICATIONS

International Search Report for PCT/JP2008/063451 mailed Sep. 30, 2008.

(Continued)

*Primary Examiner* — Lindsay Low
*Assistant Examiner* — Syed O Hasan
(74) *Attorney, Agent, or Firm* — Roberts Mlotkowski Safran & Cole P.C.

(57) ABSTRACT

A forged exhaust poppet valve and a method of solution heat treating the same are provided. The forged exhaust poppet valve (10) includes a head portion (12) which has a seat portion (14) on the outer periphery thereof and is integral with a diametrically tapered neck portion (16) connected to a stem portion (18). Using a radio-frequency heating apparatus, a solution heat treatment is given to a predetermined transitional region (A) of the neck portion and the stem portion that is exposed to exhaust air during a valve opening period such that the grain size in the region (A) does not exceed ASTM 10, thereby securing a necessary high-temperature creep strength in the region (A) and a necessary hardness (wear resistance) in the seat portion (14) and thereby rendering the exhaust poppet valve highly durable.

6 Claims, 7 Drawing Sheets

(56) References Cited

U.S. PATENT DOCUMENTS

| | | | | |
|---|---|---|---|---|
| 4,737,201 A * | 4/1988 | Larson | | 148/640 |
| 5,799,683 A * | 9/1998 | Hamada et al. | | 137/15.18 |
| 6,200,688 B1 * | 3/2001 | Liang et al. | | 428/544 |
| 6,244,234 B1 * | 6/2001 | Hoeg | | 123/188.3 |
| 6,298,817 B1 * | 10/2001 | Hoeg | | 123/188.3 |
| 2002/0020733 A1 * | 2/2002 | Hirose et al. | | 228/114.5 |

FOREIGN PATENT DOCUMENTS

| | | | |
|---|---|---|---|
| JP | 57-145927 A | 9/1982 | |
| JP | 4-27283 A | 1/1986 | |
| JP | 63-128122 A | 5/1988 | |
| JP | S63128122 | 5/1988 | |
| JP | 11-158545 A | 6/1999 | |
| JP | 3717294 | 9/2005 | |

OTHER PUBLICATIONS

Notice of First Opinion and English translation of co-pending foreign application PRC Patent Application No. 200880130514.1 dated Feb. 29, 2012.

Notice of Second Opinion Review and English translation of co-pending foreign application PRC Patent Application No. 200880130514.1 dated Aug. 24, 2012.

Office Action and English translation of co-pending foreign application KR Patent Application No. 10-2010-7027096 dated Oct. 8, 2012.

Chinese Office Action Application No. 200880130514.1 mailed Feb. 27, 2013 and its partial English Translation.

Japanese Office Action Application No. 2010-521577 mailed May 15, 2013 and its partial English Translation.

\* cited by examiner (a)

(b)

(a)

(b)

(a)

(b)

EXHAUST POPPET VALVE AND SOLUTION HEAT TREATMENT METHOD OF THE SAME

TECHNICAL FIELD

This invention relates to a one-piece exhaust poppet valve comprising a head portion having a seat portion formed on the outer periphery thereof, a linear stem portion, and a diametrically tapered neck portion of the linear stem portion, the exhaust poppet valve characterized in that a predetermined region of the poppet valve is selectively subjected to a solution heat treatment. The invention also relates to a method of solution heat treating such exhaust poppet valve.

BACKGROUND ART

This type of poppet valves can be forged from an austenitic heat-resisting steel including Nickel. Such forged valve has a grain size of ASTM (American Society for Testing and Materials) 11 or greater and has an excellent tensile strength and other low-temperature properties. However, in view of the fact that the head portion is exposed to a hot exhaust air, it has been proposed in Patent Document 1 to subject the head portion to a solution heat treatment to thereby coarsen the grains in that portion, thereby securing high-temperature properties (particularly heat resisting property of the face of the head portion).

The Patent Document 1 discloses a one-piece exhaust poppet valve comprising a head portion which has a seat portion formed on the outer periphery thereof and is integral with a diametrically tapered neck portion of a linear stem portion, wherein the valve is externally subjected to a solution heat treatment from the face of the head portion so that the head portion has a coarse grain size and desired high-temperature properties, and wherein the valve has finer grains towards the stem portion so that the stem portion has a good low-temperature ductility and a wear resistance. The Patent Document 1 also discloses a method of solution heat treating such valve.
Patent Document 1: Japanese Patent Publication No. 04-027283.

DISCLOSURE OF THE INVENTION

Objects of the Invention

However, in the solution heat treatment of a poppet valve in accordance with Patent Document 1, the poppet valve suffers from the following problems. A first problem is that grains grow (coarser) in the seat portion, since the whole head portion is subjected to the solution heat treatment. This makes the seat portion (that abuts against the valve seat of an exhaust air passage) to lose its hardness (wear resistance) appreciably. In fact, it has been found in inventors' experiments that Vickers hardness of the valve is 316 at room temperature, but it decreases to 190 after it is heated to 500° C.

A second problem is that the high-temperature creep strength of a region between the neck portion and stem portion is not improved in the prior method in spite of the fact that this region is exposed to the hot exhaust air and becomes hottest during a valve opening period.

Upon examinations of these problems, the inventors of the present invention have found sources of the problems. Regarding the first problem that the hardness of the seat portion is reduced face in the solution heat treatment of the head portion, it arises firstly from the growth of the grains, especially in an austenitic heat-resisting steel including Nickel. Secondly, it is due in part to dissolution of most carbides precipitants in the alloy, and thirdly due in part to liberation of the residual strain created in the forging of the valve.

In solving the second problem, the inventors think that a solution heat treatment is not needed to secure high-temperature properties in the lower end of the head portion since the head portion is cooled by heat conduction to the cylinder head while it is in contact therewith, and that rather the solution heat treatment be applied to a transitional region defined between the neck portion and stem portion (the region hereinafter referred to as transitional neck-stem region) to secure high-temperature creep strength in the transitional neck-stem region.

Thus, the inventors have come to a conclusion that by applying a solution heat treatment only to the predetermined transitional neck-stem region of a fine-grained forged valve such that precipitated carbides do not fully get dissolved in the heat treatment and that the grain size in the region is controlled to be coarser than those in other regions, thereby securing a required high-temperature creep strength in the transitional neck-stem region that is exposed to hot combustion gas and a required hardness (wear resistance) in the seat portion of the head portion.

This observation has been verified by the tests performed by the inventors, which leads them to file the present application.

In view of the problems pertinent to the prior art above, this invention is directed to provide a forged exhaust poppet valve whose seat portion has a necessary wear resistance and whose predetermined transitional neck-stem region has a satisfactory high-temperature creep strength after a solution heat treatment is selectively given to the predetermined transitional neck-stem region. The invention is also directed to a method of solution heat treating a forged valve to provide such poppet valve as described above.

Means for Solving the Problems

In accordance with one aspect of the invention as defined in claim 1, there is provided a one-piece exhaust poppet valve comprising a head portion which has a seat portion formed on the outer periphery thereof and is integral with the diametrically tapered neck portion of a linear stem portion of the valve, the poppet valve characterized in that the grains in a predetermined transitional neck-stem region (defined between the neck and stem portions) requiring high-temperature creep strength is controlled to be coarser than those in other regions by applying thereto a solution heat treatment while cooling the head portion.

By the term "predetermined transitional region of the valve requiring high-temperature creep strength", we mean the transitional region defined between the neck portion and the stem portion that is exposed to hot combustion gas exhausted into the exhaust passage through a gap between the seat portion and the valve seat during a valve opening period. So the transitional region becomes very hot. This region has a predetermined axial length extending between the diametrically tapered neck portion and the linear stem portion of the valve. The length and the axial position of the region depends on, for example, the inclinations of the seat portion and the valve seat as well as the shape of the exhaust passage. The region may only include the stem portion without the neck portion.

The valve may be made of an austenitic heat-resisting steel including Nickel or a nickel-based heat-resisting alloy, as defined in claim 2. In any case, the grain size in the predetermined region requiring high-temperature creep strength is preferably controlled in the solution heat treatment so as not to exceed ASTM 10.

Particularly, when the valve is made of an austenitic heat-resisting steel including Nickel, the predetermined region requiring high-temperature creep strength is preferably subjected to a solution heat treatment that will not result in complete dissolution of precipitated carbides.

It is noted here that the term "solution heat treatment" means a process in which an alloy is heated to a temperature for allowing precipitated materials to be dissolved sufficiently in the alloy, then quenched while suppressing re-precipitation of the dissolved precipitants.

The term "complete dissolution of precipitated carbides" means complete dissolution of precipitated carbides (or precipitated materials) in the alloy. The term "solution heat treatment that will not result in complete dissolution of precipitated carbides" is a solution heat treatment of an alloy in which precipitated carbides (or precipitated materials) in the alloy will not be completely dissolved before the alloy is quenched while suppressing re-precipitation of the dissolved precipitants.

(Function)

Forged exhaust poppet valves, fabricated by means of upset forging or extrusion forging for example, have fine grains. (For example, SUH 35 has a grain size of ASTM 11 or greater.) The grains in the predetermined transitional neck-stem region that is exposed to hot combustion gas during a valve opening period are controlled in the solution heat treatment to become coarser than those in other regions (with the grain size in the range of ASTM 6-10, for example, in the case of SUH 35 valve). Thus, the predetermined transitional neck-stem region acquires a required high-temperature creep strength.

On the other hand, those regions not subjected to the solution heat treatment (that is, regions other than the predetermined transitional neck-stem region) retain the forged fine grain size (ASTM 11 or greater in the case of SUH 35 valve). Thus, the head portion and the stem portion both retain a grain size necessary for required hardness (or wear resistance). As a consequence, the tip end portion and the Cotter-assembled portion of the stem can retain a high wear resistance and toughness. The same is true with the stem portion that comes into sliding contact with a valve guide.

When the valve is made of an austenitic heat-resisting steel including Nickel, carbides that has precipitated therein prior to the solution heat treatment remain partly undissolved in the predetermined transitional neck-stem portion even after the solution heat treatment, thereby providing the predetermined transitional neck-stem region with necessary hardness.

In the method of claim 4, a solution heat treatment is applied to a one-piece exhaust poppet valve comprising a head portion which has a seat portion formed on the outer periphery thereof and is integral with the diametrically tapered neck portion of a linear stem portion of the valve, in such a way that the solution heat treatment is applied to a predetermined (transitional neck-stem) region of the valve requiring high-temperature creep strength while cooling the head portion to make the grains in the predetermined region coarser than other regions.

The method of claim 4 may be applied to an exhaust poppet valve made of an austenitic heat-resisting steel including Nickel or a Ni-based heat-resisting alloy in such a way that, as defined in claim 5, the solution heat treatment is given to the predetermined region requiring high-temperature creep strength by means of a radio-frequency heating apparatus while cooling the head portion so as to make the grain size in the predetermined region equal to or less than ASTM 10.

Particularly, when the valve is made of an austenitic heat-resisting steel including Nickel, it is preferable to give the solution heat treatment to the predetermined region such that the solution heat treatment will not result in complete dissolution of precipitated carbides, cooling the head portion, as defined in claim 6, thereby suppressing reduction in hardness of the head portion that can be otherwise caused by the solution heat treatment.

(Function)

In order to apply such solution heat treatment as described above only to the predetermined region of a valve, a radio-frequency heating apparatus is preferably used, since the apparatus can selectively heat only the predetermined region.

Further, when the valve is made of an austenitic heat-resisting steel including Nickel SUH 35 for example, it is preferable to heat the alloy at a temperature above 1100° C. to permit the grains to grow. On the other hand, to prevent complete dissolution of precipitated carbides, it is preferable not to heat the alloy above 1200° C. If the alloy is heated to a temperature above 1200° C. in the treatment, precipitated carbides will be completely dissolved, which will result in reduction in hardness of the alloy, though the hardness can be recovered by an impractically long aging treatment. Thus, in order to grow grains in the alloy SUH35 for example without completely dissolving precipitated carbides, and without completely relieving residual strain introduced in the forging, it is preferable to subjecting the predetermined transitional neck-stem region to a solution heat treatment in the range from 1100° C. to 1200° C. while positively cooling the head portion 12. This heating condition is also the case with SUH38 valves.

On the other hand, unlike austenitic heat-resisting steel including Nickel valves, there is no define temperature requirement for valves made of a nickel-based heat-resisting alloy, Inconel 751 for example, to avoid complete dissolution of precipitated carbides, since no carbide is precipitated in the alloy. To allow crystal growth in this alloy, it is preferable to heat the alloy at a temperature above 1000° C., but not above 1200° C., since the toughness and anti-wear property will be reduced if the alloy is heated above 1200° C. Thus, it is preferable to heat the alloy in the range between 1000 and 1200° C.

As an example of solution heat treatment by means of a radio-frequency heating apparatus, a valve is gradually heated to a predetermined temperature between 1100 and 1200° C. over at least 20 seconds, and retained at this temperature for at least 20 seconds, and then quenched. As an alternative example, a valve may be subjected to a solution heat treatment which involves sequences of heating and quenching, wherein in each sequence the valve is quickly heated to about 900° C., retained at this temperature for at least 20 seconds, and then quickly raised to a temperature between 1100 and 1200° C., and retained at this temperature for at least 20 seconds before it is quenched.

In this way, by heating the object at a predetermined temperature in the range from 1100 to 1200° C. for more than 20 seconds after the object is raised to that temperature, grains in the entire predetermined transitional neck-stem regions, including internal as well as surface layers of the region, are grown to a substantially uniform size without causing complete dissolution of the precipitated carbides, in spite the radio-frequency heating tends to heat surface layers faster than the interior of the object.

Incidentally, although the heat transferred from the radio-frequency heating apparatus to the predetermined transitional neck-stem region is partly conducted to the head portion and the stem portion, the conducted heat will not bring the head portion and the stem portion to a high temperature for causing dissolution of the precipitated carbides nor further growth of the grains therein. Thus, the solution heat treatment will not affect the wear resistance of the seat portion of the head portion or the wear resistance and the toughness of the stem portion.

The work hardening caused by residual strain induced in the forging will result in good wear resistance, especially in the seat portion. It may be apprehended, however, that the seat portion of the head portion may be annealed by the heat conducting from the transitional neck-stem region during the solution heat treatment and lose its work hardening, and hence hardness. However, since the lower end of the head portion is cooled, the head portion, and hence the seat portion thereof, will not be sufficiently heated to undergo annealing during the solution heat treatment of the transitional neck-stem region.

Results of the Invention

The inventive method of solution heat treatment provides an exceedingly durable exhaust poppet valve comprising a predetermined transitional neck-stem region having a required high-temperature creep strength, and a seat portion having a sufficient hardness (or wear resistance).

As a result, the invention enables use of a costless austenitic heat-resisting steel that contains a slight nickel to obtain an exhaust poppet valve that can be used at high temperatures and under large loads without depositing an expensive wear-resistant alloy on the seat portion of an exhaust poppet valve or manufacturing the head portion and the head portion side of the stem portion using an expensive nickel-based heat-resistant alloy, as is done in the prior art.

If a valve made of an expensive nickel-based alloy, the creep resistance of the transitional neck-stem region of the valve can be also enhanced by the invention while retaining high hardness in the seat portion. In this case, the exhaust poppet valve can be used with a high load engine without depositing an expensive wear-resistant alloy on the seat portion.

In addition, since the stem portion can secure necessary low-temperature properties and a wear-resistance, necessary wear resistance and fatigue strength can be secured for the Cotter groove and the tip end portion. So can be necessary wear resistance of the stem portion in contact with the valve guide.

Further, the inventive solution heat treatment method can be accurately applied only to the predetermined transitional neck-stem region of a valve without loosing the work hardness in the head portion of the valve. As a result, the invention can provide a highly durable exhaust poppet valve that has not only a required high-temperature creep strength in the transitional neck-stem region but also a sufficient hardness (wear resistance) in the seat portion.

Particularly, as defined in claim 6, the invention can provide a cost-effective and durable exhaust poppet valve, made of an austenitic heat-resisting steel including Nickel, wherein the predetermined transitional neck-stem region has a required high-temperature creep strength without appreciably losing its hardness.

BEST MODE FOR CARRYING OUT THE INVENTION

The invention will be now described in detail by way of example with reference to the accompanying drawings.

FIGS. 1 through 9 show an exhaust poppet valve in accordance with a first embodiment of the invention.

More particularly, FIG. 1 shows a side view of the poppet valve.

FIG. 2, a cross sectional view of an exhaust air passage of an automobile engine, taken along a line near the poppet valve.

FIG. 3 shows a grain size distribution of a solution heat treated region of the valve.

FIGS. 4(a)-(b) show in enlarged cross section microstructures in a solution heat treated region and non-treated region of a poppet valve, respectively.

FIG. 5 compares creep elongation percentages in the regions subjected to and not subjected to the solution heat treatment.

FIG. 6 is a schematic diagram of a radio-frequency heating apparatus for use in solution heat treatment of a predetermined transitional neck-stem region of the poppet valve.

FIG. 7(a) illustrates a first solution heat treatment mode P1 executable in different heating patterns P1-1 through P1-3. FIG. 7(b), resultant grain sizes in the solution heat treated region subjected to the heating patterns P1-1 through P1-3.

FIG. 8(b) and FIG. 9(b), similar resultant grain sizes observed in the similar regions under second and third solution heat treatment modes defined in FIGS. 8(a) and 9(a), respectively.

In these figures, especially FIGS. 1 and 2, reference numeral 10 indicates an exhaust poppet valve comprising a generally disk-like head portion 12 having a tapered seat portion 14 on the outer periphery thereof. The head portion 12 is integral with the diametrically tapered neck portion 16 of a linear stem portion 18. The poppet valve is fabricated from austenitic heat-resisting steel SUH 35 by means of upset forging or extrusion forging.

The valve 10 is mounted on an engine such that it can slide on a cylindrical valve guide 31 provided adjacent an exhaust air passage 30 of the engine, as shown in FIG. 2. The valve 10 is urged (upward in FIG. 2) by a compression coil spring 34 so that the seat portion 14 of the valve abuts against the annular valve seat 32 of the exhaust air passage 30. Reference numeral 40 refers to a cam mounted on a cam stem. Reference numeral 42 refers to a tappet provided between the cam 40 and the upper end of the stem portion 18.

The exhaust air passage 30 is opened and closed by the valve 10 moved up and down by the cam 40 in rotation. FIG. 2 (a)-(b) show closed and open conditions of the exhaust air passage 30, respectively.

Following forging, a predetermined transitional neck-stem region A of the valve 10 between the neck portion 16 and the stem portion 18 is subjected to a solution heat treatment using a radio-frequency heating apparatus 20 as shown in FIG. 6 to improve the high-temperature creep strength of the region A.

It is noted that a forged valve has a very fine grain size in the range of ASTM 11-12 (as shown in FIG. 4(a)) and has an excellent low-temperature strength, but may lack a desired high-temperature creep strength for the predetermined transitional neck-stem region A (FIG. 2 (b)) that is exposed to hot exhaust air during a valve opening period. In the present invention, a solution heat treatment is applied to the region A without allowing complete dissolution of precipitated carbides so that the grain size in the predetermined transitional neck-stem region A is controlled not to exceed the grain size of ASTM 10 (as seen in FIG. 4(b)), that is, the grains are coarser than those in the rest portions (ASTM 11-12) of the valve, thereby ensuring sufficient high-temperature creep strength in the region A (FIG. 5). It should be noted that, because the solution heat treatment is performed within a prescribed temperature range, precipitated carbides (i.e. carbides that have been precipitated in the alloy prior to the solution heat treatment) partly remain undissolved in the transitional neck-stem region A even after the solution heat treatment, which appreciably suppresses reduction in hardness in the region A. In addition, a decrease in hardness of the region A caused by the solution heat treatment can be restored to a near-pretreatment level by an age-hardening process subsequent to the solution heat treatment.

FIG. 5 compares the relationship between the creep elongation rate (ordinate) vs. test temperature (abscissa) of a solution heat treated valve 10 subjected to an age-hardening process in accordance with the invention, with that of a valve not subjected to a solution heat treatment (or annealed valve). This valve 10 has been aged at 750° C. for 1 hour following a solution heat treatment, and machined to a final product. It is seen from FIG. 5 that the comparative valve (not solution heat treated) has an elongation rate as high as 2.8% at 800° C., whereas the inventive valve (solution heat treated) has an exceedingly low elongation rate of 0.44% at 800° C., verifying superb creep strength of the inventive valve at high temperatures.

It is noted that the head portion 12 and the stem portion 18, located outside the predetermined transitional neck-stem region and not subjected to the solution heat treatment, maintain a substantially the same fine grain size above ASTM 11 as a newly forged valve. Thus, the head portion 12 (including the face portion 14) and the stem portion 18 maintain required hardness (wear resistance).

Moreover, it is observed that, by positively cooling the lower end of the head portion 12 (i.e. bottom end of the valve as viewed in FIG. 1) to suppress the influence of the heat transmitted to the seat portion 14 (and thereby not to liberate residual strain in the head portion 12, particularly in the seat portion 14), the surface of the head portion 12 retained Vickers hardness of 460 at room temperature. The temperature of the seat portion 14 can rise as high as 500° C. during a valve working period. However, it can be said that the seat portion 14 can retain sufficient Vickers hardness at high temperatures, since the seat portion has Vickers hardness of 305 at 500° C.

In order to apply a solution heat treatment only to the predetermined transitional neck-stem region A of the valve 10, it is preferable to use a radio-frequency heating apparatus 20 (as depicted in FIG. 6), since it can selectively heat a prescribed region.

In the case of SUH 35, the alloy is preferably heated to or higher than 1100° C. to allow good growth of the grains. On the other hand, in order to prevent complete dissolution of precipitated carbides, the alloy should not be heated above 1200° C. Therefore, in order to allow grains of a SUH 35 valve to grow without complete dissolution of precipitated carbides, it is desirable to heat the SUH 35 valve at a temperature equal to or above 1100° C. but below 1200° C.

For example, the solution heat treatment by means of a radio-frequency heating apparatus 20 may be done to uniformly heat the predetermined region A, i.e. uniformly from the surface to the interior thereof, by retaining the predetermined region A at a predetermined temperature between 1100 and 1200° C. for a prescribed period of time after the region is raised to this temperature, as will be described in detail shortly, thereby allowing grains in the entire predetermined region A to grow to a substantially the same grain size without completely dissolving precipitated carbides.

Incidentally, the heat transmitted from the radio-frequency heating apparatus 20 to the predetermined transitional neck-stem region A is conducted in part to the head portion 12 and the stem portion 18. However, this heat will not heat the head portion 12 and the stem portion 18 to a high temperature for causing complete dissolution of the precipitated carbides or causing further growth of grains therein. Thus, the heat does not affect neither the wear resistance of the seat portion of the head portion nor the wear resistance and toughness of the stem portion.

It is noted that a forged valve 10, especially the seat portion 14 thereof, has a superior wear resistance due to residual strain created by work hardening in the forging. It might be conjectured, however, that during a solution heat treatment the heat conducting from the predetermined transitional neck-stem region A would anneal this work hardening and reduce the hardness of the seat portion 14. In actuality, however, the heat will not raise the temperature of the seat portion 14 to cause such annealing, since the head portion 12 is positively cooled from the lower end surface thereof (as viewed in FIG. 6) during the solution heat treatment.

Referring to FIGS. 6-9, a process of solution heat treatment of the predetermined transitional neck-stem region A between the neck portion and stem portion of a valve 10 will now be described in detail.

As shown in FIG. 6, the radio-frequency heating apparatus 20 for performing solution heat treatment to the predetermined transitional neck-stem region A has a metal cooling plate 22 on which the valve 10 is placed in the upright position with the face of the head portion 12 held in contact with the plate 22; and a pair of coils 24 arranged above the cooling metal plate 22, for heating the predetermined transitional neck-stem region A.

The vertical and transverse positions of the paired heating coils 24 can be adjusted relative to the cooling metal plate 22.

Provided inside the cooling metal plate 22 is a circulatory cooling-water passage 23, through which cooling water is circulated when the radio-frequency heating apparatus 20 is in operation. As a consequence, the head portion 12 is cooled by the cooling metal plate 22 while the coils 24 are heating the predetermined transitional neck-stem region A.

The cooling metal plate 22 can be rotated together with the valve 10 so that the valve 10 can be heated uniformly in the radially inward direction.

The predetermined transitional neck-stem region A of the valve 10 has a length of 15 mm, extending from a position of 15 mm to a position of 30 mm with respect to the face of the head portion 12 of the valve 10. This region is heated by adjusting the height of the paired heating coils 24 of the radio-frequency heating apparatus 20, as shown in FIG. 6. During heating, the cooling metal plate 22 is rotated at 70 rpm to suppress uneven heating of the region A in the circumferential direction.

Taking account of the penetration depth of the heating wave and the frequency of the wave, the frequency of the heating apparatus 20 is set to 30 kHz. In a first heating pattern P1-1 of heating mode P1 by means of RF heating apparatus 20, the region A is gradually heated to 1150° C. for 20 seconds to uniformly heat the entire volume of the region A, after which the region is retained at that temperature for 10 seconds, and is then quenched, as shown in FIG. 7 (*a*). In a second and a third heating pattern P1-2 and P1-3, respectively, the region A is retained at 1150° C. for 20 seconds and 40 seconds, respectively, before quickly oil-cooling the region A.

In a second heating mode P2 as shown in FIG. 8 (*a*), the region A is gradually heated to 1150° C. for 40 seconds, retained at that temperature for 10 seconds in heating pattern P2-1 to heat the entire volume of the region A uniformly, and then oil-quenched. In heating patterns P2-2 and P2-3, the region is retained at 1150° C. for 20 second and 40 seconds, respectively, before the oil quenching.

In a third heating mode P3 as shown in FIG. 9 (a), the region A is quickly heated to 900° C., retained at that temperature for 20 seconds, then quickly heated to 1150° C. and retained at this temperature for 20 seconds in heating pattern P3-1 or for 40 seconds in heating pattern P3-2 before the region A is oil quenched.

FIGS. 7(b), 8(b), and 9(b) respectively show how grains in the surface layer and interior of the region A change gradually subsequent to a solution heat treatment in heating mode P1, P2, and P3. Grain sizes in the region A are measured at the heights of 15 mm, 24 mm, and 30 mm from the face of the head portion 12, as shown in FIG. 3.

Referring to FIG. 7, there are shown how grain sizes change in three different heating patterns P1-1, P1-2, and P1-3 of heating mode P1, in which the initial range of grain size in the region A, changes from ASTM 11-12 to ASTM 7.5-11 in heating pattern P1-1 (consisting of 20-second heating, 10-second heat retention, and subsequent oil quenching) and, in heating pattern P1-2 (consisting of 20-second heating, 20-second heat retention, and subsequent oil quenching), favorably changes to ASTM 7.5-10. In contrast, in heating pattern P1-3 (consisting of 20-second heating, 40-second heat retention, and subsequent quenching), a coarser grain size results than in heating pattern P1-2. However, this heating pattern requires extra 20 seconds for extra heat retention of the region A as compared with heating pattern P1-2.

Referring to FIG. 8, there are shown how grain sizes change in heating patterns P2-1, P2-2, and P2-3 of heating mode P2. It is seen that the initial range of grain size in the region A changes from ASTM 11-12 to ASTM 7.5-10 in heating pattern P2-1 (consisting of 40-second heating, 10-second heat retention, and subsequent oil quenching) and, in heating pattern P2-2 (consisting of 40-second heating, 20-second heat retention, and subsequent oil quenching), favorably changes to ASTM 7.0-9.0. It is noted that in heating pattern P2-3 (consisting of 40-second heating, 40-second heat retention, and subsequent oil quenching), change in grain size is almost the same as in heating pattern P2-2.

Referring to FIG. 9, there are shown changes in grain size in heating patterns P2-1, P3-2, and P3-3 of heating mode P3: the initial range of grain size in the region A favorably changes from ASTM 11-12 to ASTM 7.5-10 in heating pattern P3-1 (consisting of 20-second preheating, 20-second heat retention, and subsequent oil quenching); the ASTM range favorably changes to ASTM 7.0-9 in heating pattern P3-2 (consisting of 20-second preheating, 40-second heat retention, and subsequent oil quenching). However, extra 20-second heat retention is required in heating pattern P3-2.

It should be understood that in the example shown herein the solution heat treatment is controlled to heat the transitional neck-stem region A over the length of 15-30 mm with respect to the face of the head portion. However, the length of the region to be subjected to a solution heat treatment (i.e. region requiring high-temperature creep strength) depends on the particular specification of the engine and valves used.

Quenching is generally used subsequent to a heating to retain good solid solubility of alloy in the region A. Although oil quenching is used in the exemplary solution heat treatments above, water-quenching may be alternatively used.

Moreover, if the cooling metal plate 22 has a sufficient heat capacity and a good heat conductivity, no cooling water may be needed.

Further, in place of SUH 35, an austenitic heat-resisting steel such as SUH 38 or a nickel-based heat-resisting alloy such as Inconel 751 may be used as an alternative material for the valve 10. When SUH 38 is the raw material of the valve 10, a desired grain size in the predetermined transitional neck-stem region A that requires high-temperature creep strength is in the range of ASTM 6-10, which is the same for SUH 35 valve. However, when a nickel-based heat-resisting alloy, Inconel 751 say, is the raw material for the valve 10, a preferred grain size is in the range ASTM 4-10.

Figure 1:
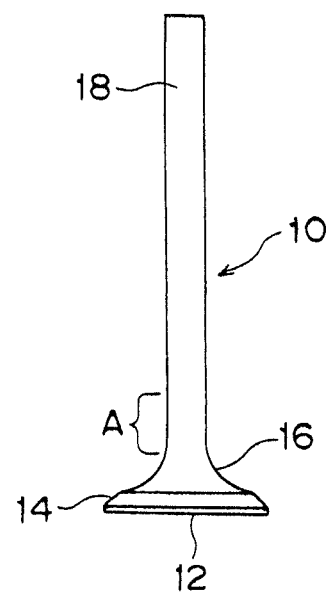
FIG. 1 shows a side elevation of an exhaust poppet valve in accordance with a first embodiment of the invention.
Figure 2:
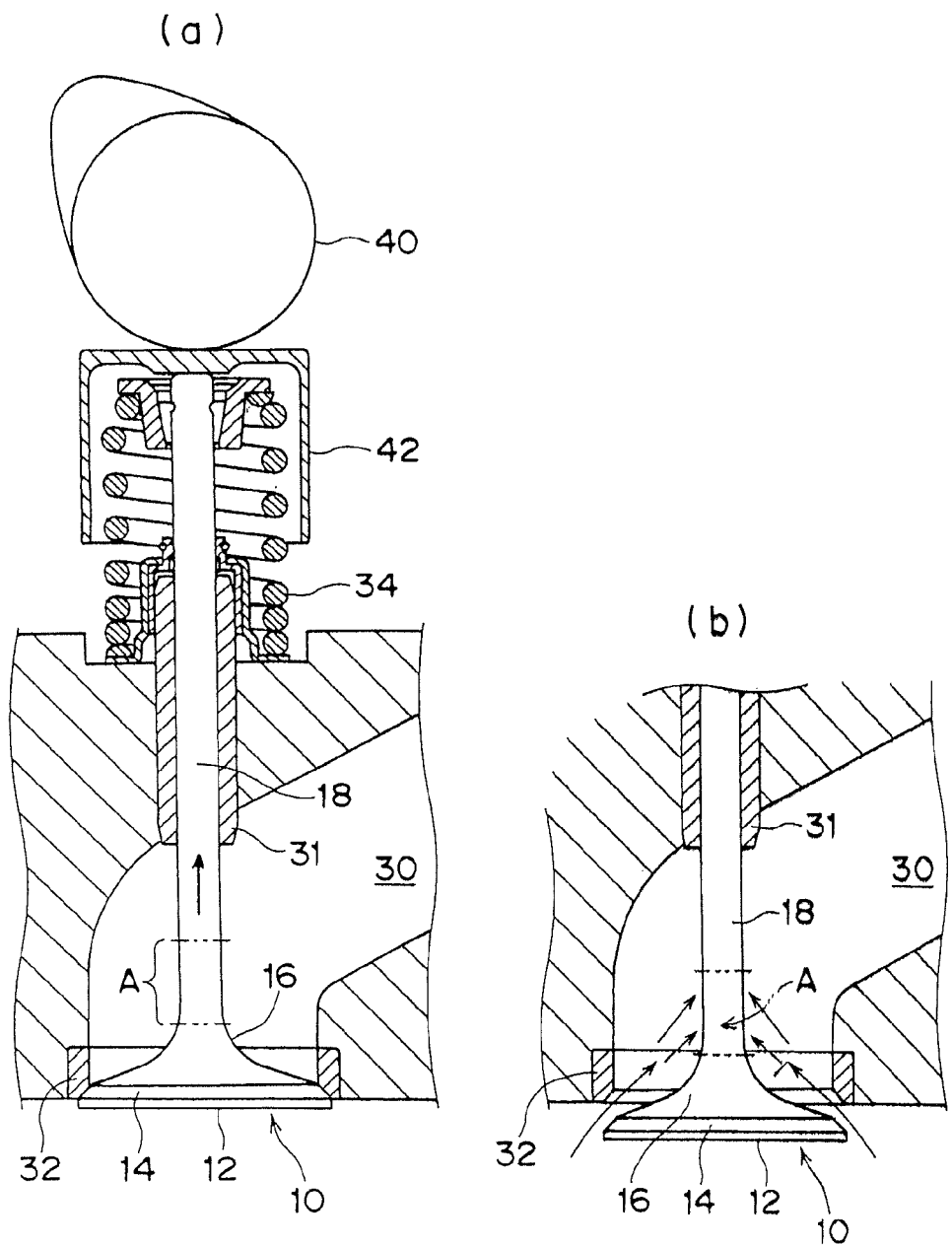
FIG. 2 shows a cross section of an automobile engine taken along a line near an exhaust air passage.
Figure 3:
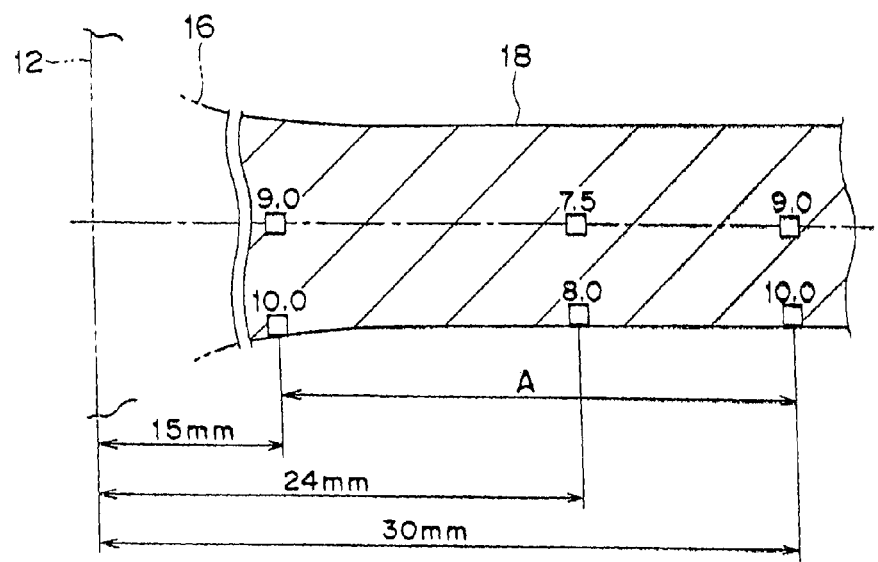
FIG. 3 shows a distribution of grain size (ASTM) in a solution heat-treated region.
Figure 4:
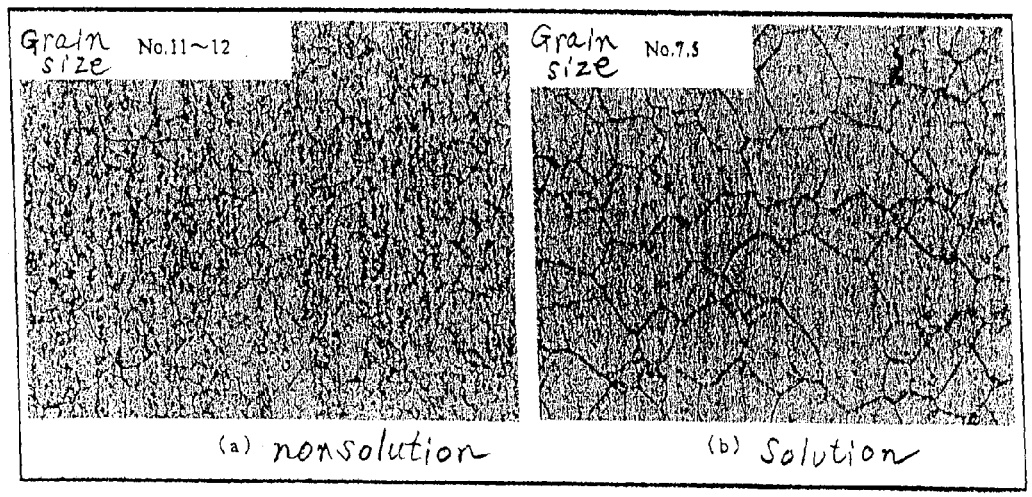
FIG. 4 shows enlarged cross section of a solution heat-treated region (4(a)) and non-solution heat-treated region (4(b)), showing in detail the microstructures therein.
Figure 5:
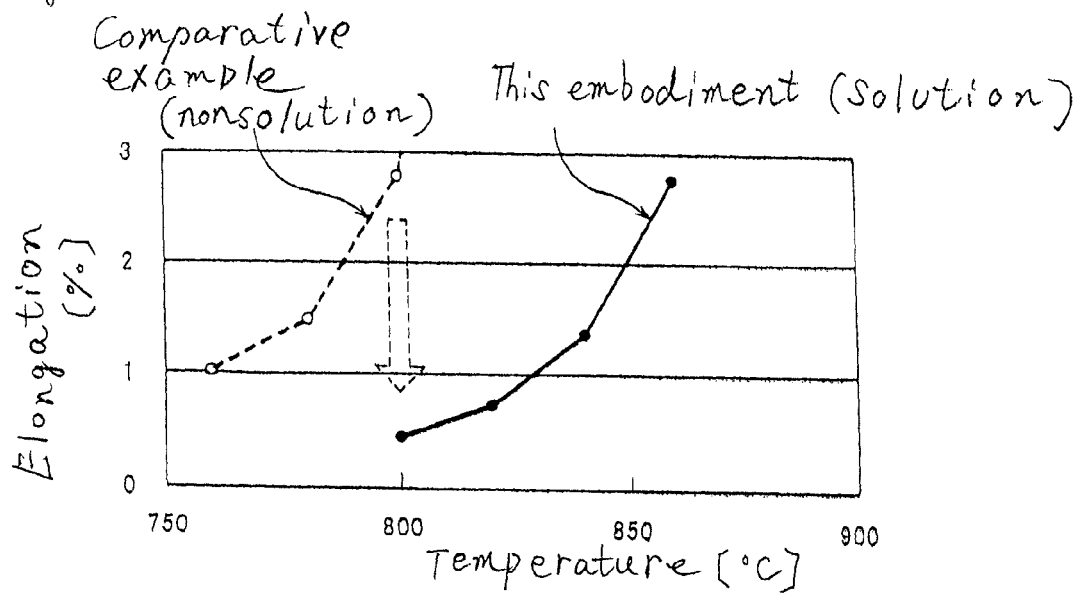
FIG. 5 compares the creep elongation percentages of a material subjected to and not subjected to a solution heat treatment.
Figure 6:
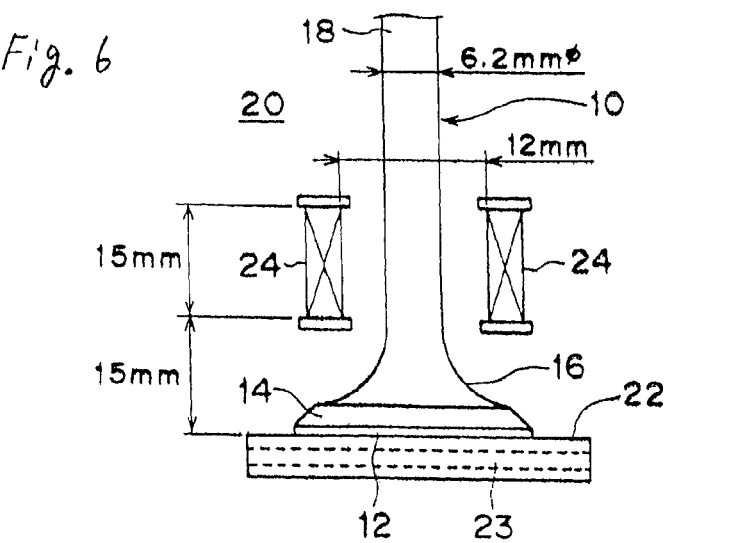
FIG. 6 is a schematic diagram of a radio-frequency heating apparatus for solution heat treatment of a predetermined transitional neck-stem region of a valve.
Figure 7:
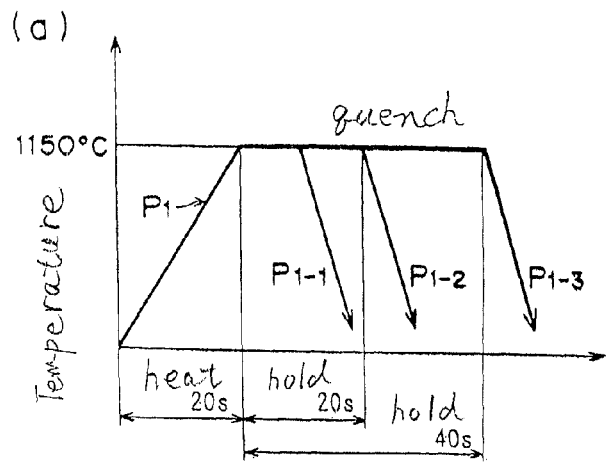
FIG. 7(a) is a graphical representation of heating patterns of a first heat treatment mode.
FIG. 7(b) shows grain sizes that appear in the region subjected to different heating patterns of the first heating mode.
Figure 7:
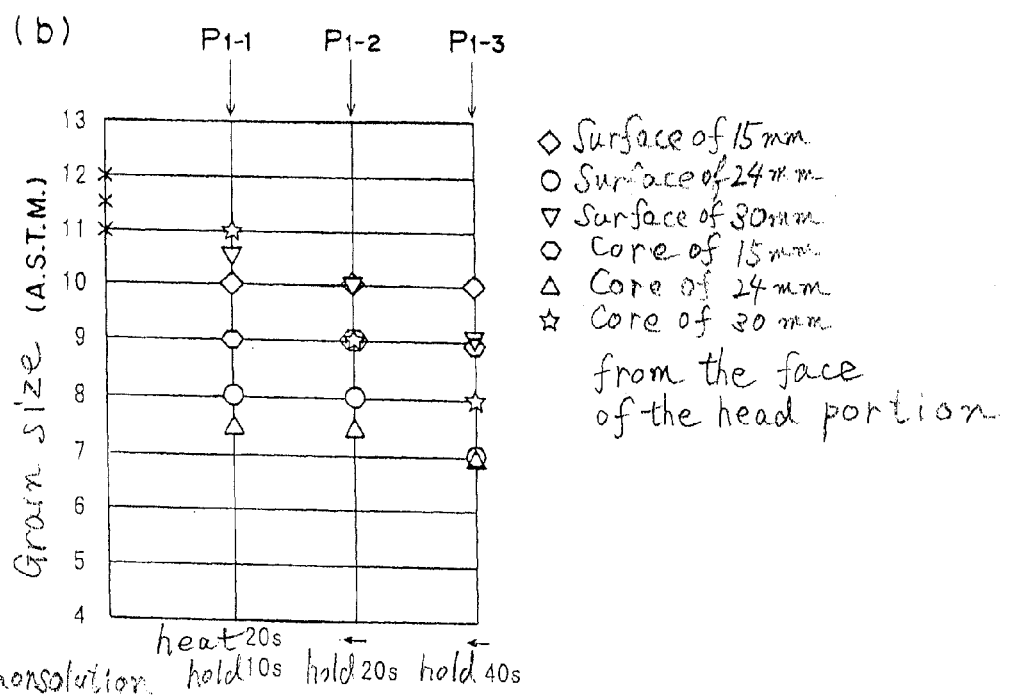
Figure 8:
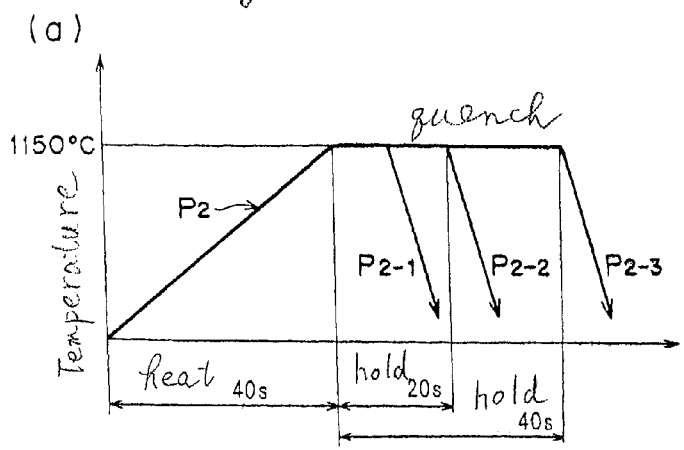
FIG. 8(a) is a graphical representation of heating patterns of a second heat treatment mode.
FIG. 8(b) shows grain sizes that appear in the region subjected to different heating patterns of the second heating mode.
Figure 8:
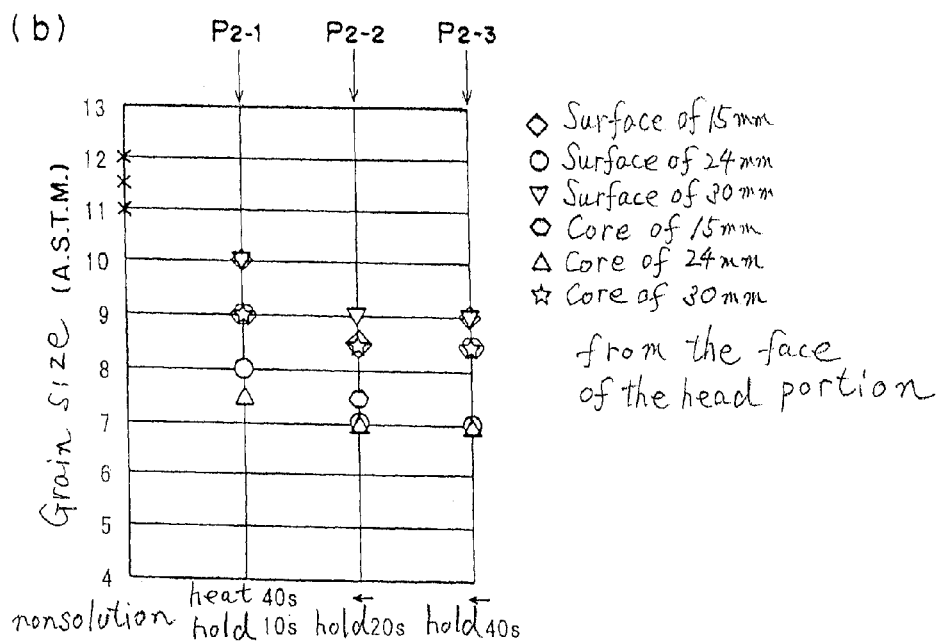
Figure 9:
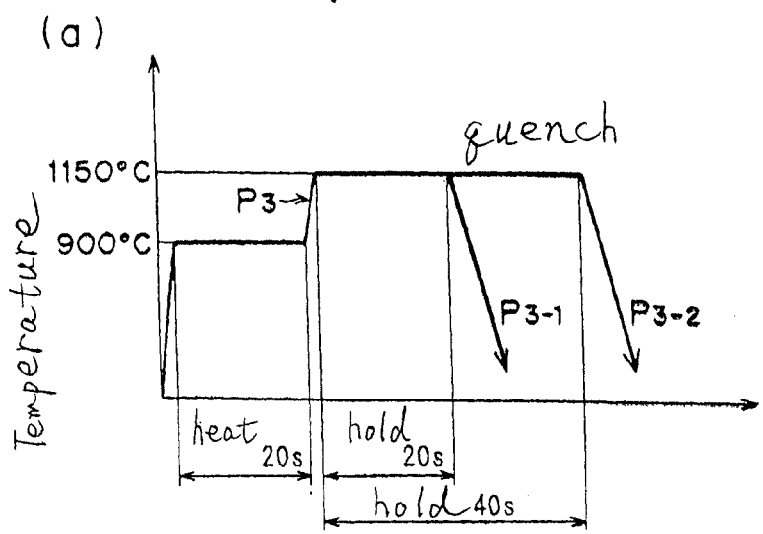
FIG. 9(a) is a graphical representation of heating patterns of a third heat treatment mode.
FIG. 9(b) shows grain sizes that appear in the region subjected to different heating patterns of the third heating mode.
Figure 9:
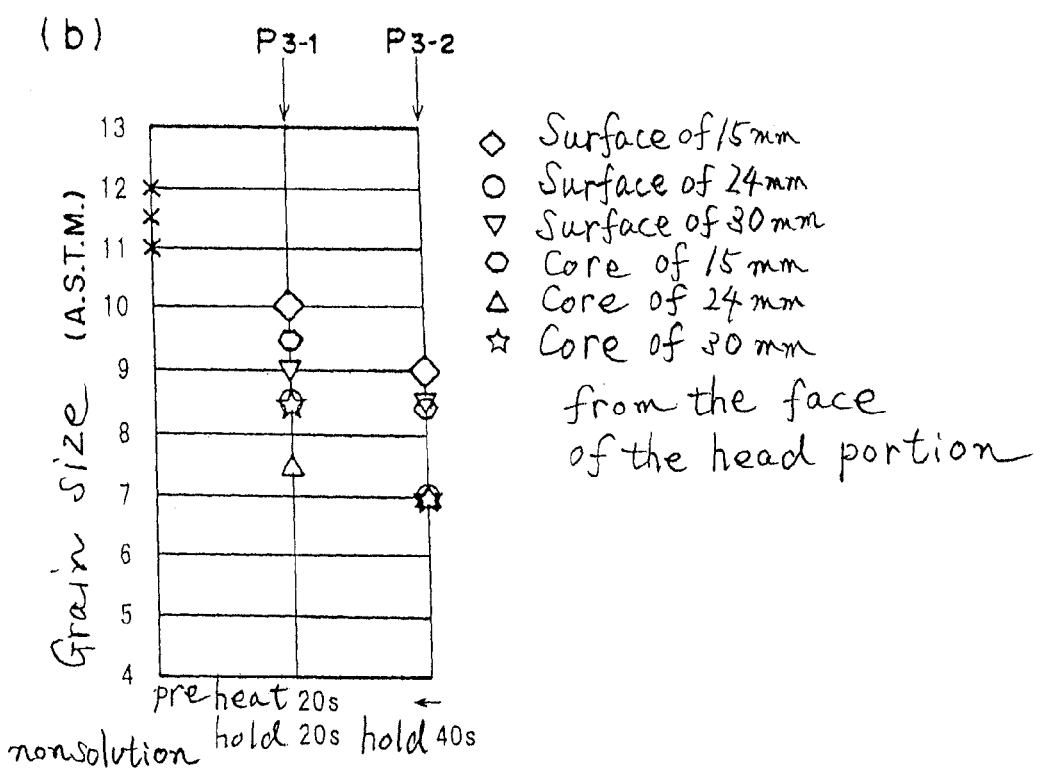

REFERENCE NUMERALS 10 exhaust poppet valve
12 head portion
14 seat portion
16 neck portion
18 stem portion
A transitional neck-stem region of the valve subjected to a solution heat treatment.
20 radio-frequency heating apparatus
22 cooling plate
24 heating coils

The invention claimed is:

1. A one-piece exhaust poppet valve comprising a head portion which has a seat portion formed on the outer periphery thereof and is integral with the diametrically tapered neck portion of a linear stem portion of the valve, the poppet valve characterized in that the grains in a predetermined transitional neck-stem region of the valve requiring high-temperature creep strength is controlled to be coarser than those in all other regions of the valve by applying thereto a solution heat treatment while cooling the lower end of the head portion.

2. The exhaust poppet valve according to claim 1, wherein the valve is made of an austenitic heat resisting steel including Nickel or of a nickel-based heat-resisting alloy, and wherein the grain size in the predetermined transitional neck-stem region requiring high-temperature creep strength is controlled in the solution heat treatment so as not to exceed ASTM 10.

3. The exhaust poppet valve according to claim 2, wherein the valve is made of an austenitic heat resisting steel including Nickel, and wherein the predetermined transitional neck-stem region is preferably subjected to a solution heat treatment that will not result in complete dissolution of precipitated carbides.

4. A method of solution heat treating one-piece exhaust poppet valve comprising a head portion having a seat portion formed on the outer periphery thereof and integral with a diametrically tapered neck portion, and a linear stem portion of the valve, such that a solution heat treatment is applied to a predetermined transitional neck-stem region of the valve requiring high-temperature creep strength while cooling the lower end of the head portion to make the grains in the predetermined region coarser than in all other regions of the valve.

5. The method according to claim 4, wherein the valve is made of an austenitic heat-resisting steel including Nickel or a Ni-based heat resisting alloy, and wherein the solution heat treatment is given to the predetermined transitional neck-stem region requiring high-temperature creep strength by means of a radio-frequency heating apparatus while cooling the head portion so as to make the grain size in the predetermined region equal to or less than ASTM 10.

6. The method according to claim 5, wherein the valve is made of an austenitic heat-resisting steel including Nickel, and wherein the solution heat treatment is given to the predetermined transitional neck-stem region such that the solution heat treatment will not result in complete dissolution of precipitated carbides.

* * * * *